(12) United States Patent
Martinez et al.

(10) Patent No.: US 9,664,403 B2
(45) Date of Patent: May 30, 2017

(54) REGULATION METHOD FOR REGULATING AN AIR CONDITIONING SYSTEM

(71) Applicants: Ingevert 2000, S.L., Malaga (ES); Aeris Soluciones de Control, S.L., Malaga (ES)

(72) Inventors: Antonio Mediato Martinez, Malaga (ES); Francisco Garcia Vacas, Malaga (ES); Francisco Vertedor Sanchez, Malaga (ES)

(73) Assignees: Ingevert 2000, S.L., Malaga (ES); Aeris Soluciones De Control, S.L., Malaga (ES)

( * ) Notice: Subject to any disclaimer, the term of this patent is extended or adjusted under 35 U.S.C. 154(b) by 495 days.

(21) Appl. No.: 14/450,825

(22) Filed: Aug. 4, 2014

(65) Prior Publication Data
US 2015/0066222 A1    Mar. 5, 2015

(30) Foreign Application Priority Data
Sep. 5, 2013 (EP) ..................................... 13382348

(51) Int. Cl.
*G05D 23/00* (2006.01)
*F24F 11/00* (2006.01)
(Continued)

(52) U.S. Cl.
CPC ........ *F24F 11/006* (2013.01); *F24D 19/1084* (2013.01); *F24F 3/044* (2013.01);
(Continued)

(58) Field of Classification Search
CPC .................................................. F24F 11/006
(Continued)

(56) References Cited

U.S. PATENT DOCUMENTS 3,690,548 A * 9/1972 McNabney .............. F24F 11/04
236/1 C
3,901,310 A * 8/1975 Strawn .................. F24F 3/0527
165/216

(Continued)

FOREIGN PATENT DOCUMENTS

| GB | 2227335 | 7/1990 |
| GB | 2261964 | 6/1993 |
| WO | WO2011087163 | 7/2011 |

OTHER PUBLICATIONS

Heiselberg, Per. Expert Guide: Part 1 Responsive Building Concepts. Department of Civil Engineering, Aalborg University, 2010. pp. 1-136.*

(Continued)

*Primary Examiner* — Satish Rampuria
(74) *Attorney, Agent, or Firm* — Caesar Rivise, PC

(57) ABSTRACT

The object of this invention a regulation method for regulating an air conditioning system suitable for independently regulating the temperature of a plurality of zones. The air conditioning system comprises a thermal cycle machine. According to various embodiments, the thermal cycle machine is capable of delivering a cold airflow, a hot airflow or both. This flow is divided into smaller flows supplied to each of the zones to be regulated. The method according to the invention allows regulating these smaller flows as well as the operating conditions of the thermal cycle machine. According to various embodiments, the method additionally incorporates more complex variants involving variables such as pressure or thermal inertia. Likewise, according to one embodiment the air conditioning system incorporates a particular distributor configuration simplifying the installation of said regulation system.

13 Claims, 8 Drawing Sheets

(51) Int. Cl.
*F24F 3/044* (2006.01)
*F24D 19/10* (2006.01)
*F24F 11/02* (2006.01)
*F24F 11/04* (2006.01)
*F24F 11/053* (2006.01)

(52) U.S. Cl.
CPC ........ *F24F 3/0442* (2013.01); *F24F 11/0001* (2013.01); *F24F 11/0012* (2013.01); *F24F 11/0076* (2013.01); *F24F 11/022* (2013.01); *F24F 11/04* (2013.01); *F24F 11/053* (2013.01); *F24F 2011/0056* (2013.01); *F24F 2011/0061* (2013.01); *Y02B 30/767* (2013.01)

(58) Field of Classification Search
USPC .................................................. 700/275–306
See application file for complete search history.

(56) References Cited

U.S. PATENT DOCUMENTS

| | | | | |
|---|---|---|---|---|
| 3,982,583 A | * | 9/1976 | Shavit | ................. F24F 11/0001 165/249 |
| 4,482,009 A | * | 11/1984 | Nishimura | ......... B60H 1/00842 165/100 |
| 4,497,031 A | * | 1/1985 | Froehling | ............ F24F 11/0009 165/212 |
| 4,811,897 A | | 3/1989 | Kobayashi et al. | |
| 5,076,346 A | | 12/1991 | Otsuka | |
| 5,833,134 A | * | 11/1998 | Ho | ....................... F24F 11/0076 236/49.3 |
| 2012/0253524 A1 | * | 10/2012 | Norrell | ............... F24F 13/1426 700/277 |

OTHER PUBLICATIONS

Zhou, Peng, and Nora El-Gohary. "Ontology-based automated information extraction from building energy conservation codes." Automation in Construction 74 (2017): pp. 103-117.*

Reddy, T. Agami. "Mathematical Models and Data Analysis." Applied Data Analysis and Modeling for Energy Engineers and Scientists. Springer US, 2011. pp. 1-25.*

European Search Report for related European Patent Application No. EP 13 38 2348, dated Jan. 28, 2014.

* cited by examiner

REGULATION METHOD FOR REGULATING AN AIR CONDITIONING SYSTEM

OBJECT OF THE INVENTION

The object of this invention is a regulation method for regulating an air conditioning system, suitable for independently regulating the temperature of a plurality of zones.

The air conditioning system comprises a thermal cycle machine. According to various embodiments, the thermal cycle machine is capable of delivering a cold airflow, a hot airflow or both. This flow is divided into smaller flows supplied to each of the zones to be regulated. The method according to the invention allows regulating these smaller flows as well as the operating conditions of the thermal cycle machine.

According to various embodiments, the method additionally incorporates more complex variants involving variables such as pressure or thermal inertia.

Likewise, according to one embodiment the air conditioning system incorporates a particular distributor configuration simplifying the installation of said regulation system.

BACKGROUND OF THE INVENTION

Air conditioning systems use a thermal cycle machine suitable for generating cold, heat or both, as in the case of heat pumps.

When the area to be conditioned is not a single area but is divided into sectors, the only airflow delivered by the thermal cycle machine must be divided into smaller flows suited to the particular conditions of each area.

Each area can have different temperature requirements and can also need different flows coming from the thermal cycle machine, since each area may have a different volume, different insulations or also different thermal inertias.

Air conditioning systems in which the thermal cycle machine delivers the main airflow to a single conduit are known in the state of the art. This main flow is divided into smaller flows using connections with bypasses to conduits having a smaller section, where the section of each of the conduits after the bypass is chosen proportional to the flow to be transported; and it is in turn proportional to the requirements of the zones into which these conduits flow.

In these systems, the only possible adjustment of the conditions of the flows reaching each of the zones is either the adjustment of the thermal cycle machine or the use of gratings at the outlets of the conduits completely or partially closing the outflow.

If such adjustable outlet is used, one of the problems that arise is that they offset all the flows exiting through the rest of the outlets, so individual regulation is not always possible.

The present invention is a regulation method for regulating an air conditioning system individually and automatically regulating the conditions of the outflow in each of the zones to be conditioned as well as the operating conditions of the thermal cycle machine.

SUMMARY OF THE INVENTION

The present invention is a regulation method for regulating an air conditioning system suitable for conditioning the temperature of a set of n zones. Each of these n zones can have different temperature requirements that can be defined by means of what will be called a "set point temperature". Physically speaking, it is also possible that two or more zones are not physically separated, by a wall for example, but given their dimensions it is suitable to identify two adjacent zones and that such zones have different requirements. This can be the case of a large living room, where one side of said living room requires a temperature lower than that of the other side.

It is also necessary to indicate that a functional notation will be used throughout the description, in the form of $y=f(x)$ for example, indicating that the dependent variable y depends on the independent variable x; and the function $f$ is what establishes their dependence. The relationship between one variable and another will be determined by particular expressions of the function $f$, for example. Nevertheless, this notation must be interpreted to mean that the variable y depends on the variable x at all times, even though it is however possible that it also depends on other variables. In other words, the expressions in the form of $y=f(x)$ must not be interpreted to mean that the dependence is strictly on one variable, in this case the variable x, but rather that it depends at least on the variable x. In other words, the expression $y=f(x)$ must be interpreted as an abbreviated expression of $y=f(x, \ldots)$ and therefore specifying that y is a function of x allows said variable y to also be able to depend on other additional variables.

As indicated, the regulation method acts on a system. The system at least comprises:

a) a thermal cycle machine for generating an airflow at a specific temperature, and a pressure greater than atmospheric pressure, where said machine has a signal input interface suitable for specifying at least the machine fan speed $V_m$, or the machine set point temperature $T_m$, or both; allowing the regulation of thermal power and the adjustment of the supplied air discharge, b) a distributor comprising:
  an inlet coupled to the outlet of the machine,
  a plurality n of outlets for conditioning a plurality of zones, where each of the outlets $i=1 \ldots n$ in turn comprises a valve with an adjustable actuator that can be adjusted according to a degree of aperture $A_i$, c) a set of n temperature sensors $STz_i$, $i=1 \ldots n$ each of them intended for being located in each of the zones to be conditioned, for providing a temperature signal $Tz_i$ for the temperature measured in the i-th zone, d) a central processing unit at least comprising:
  n signal inputs for the reading of the temperature $Tz_i$ in any of the sensors $STz_i$, $i=1 \ldots n$,
  n value inputs for the reading of the set point temperature in each of the zones to be conditioned $Tc_i$, $i=1 \ldots n$,
  n outputs for providing actuation signals, for the independent management of each of the n adjustable actuators of the valves, located at each of the outlets of the distributor,
  an output for providing an actuation signal for acting on the input interface of the thermal cycle machine for modifying its operating parameters.

The thermal cycle machine provides a hot or cold airflow, and it allows at least regulating the fan speed $V_m$, or the set point temperature $T_m$, or both. The common way to allow this regulation is by incorporating an interface. This interface receives a signal for giving orders which are interpreted by the thermal cycle machine. The value of the fan speed $V_m$ or of the machine set point temperature $T_m$ is thus established from said signal. This signal can be an analogue or digital signal, in which case the interface can be complex as it allows communication protocols manageable by means of software.

The thermal cycle machine provides the flow, delivering it to a distributor. The distributor must be interpreted as any element interposed between the machine and the outlets for the flow reaching each zone responsible for transporting the flow. This distributor also has bypasses so that the main flow is divided into smaller flows reaching each of the zones.

In other words, the distributor has a plurality n of outlets for conditioning the plurality of zones. Each of these outlets comprises a valve with an adjustable actuator that can be adjusted according to a degree of aperture $A_i$, i=1 . . . n being the index identifying the valve or the outlet. This valve does not necessarily have to be located at the point of the air outlet into the i-th zone, but it has to be located in a place which regulates said outlet individually.

The degree of aperture $A_i$ is a variable taking values in the range of [0,1], where 0 indicates that the valve is closed and 1 indicates that the valve is open. Even though this convention has been adopted and will be shown as such in this description and in the claims, adopting conventions such as said variable taking values in the range of [a, b], a being the value corresponding to having the valve closed and b being the value corresponding to having the valve open, is understood to be possible. Nevertheless, it is understood that defining variables having their path domain in one range or another are related by a simple (preferably linear) bijective transformation and therefore equivalent. Furthermore, using a variable having its path in the interval [a,b] is equivalent to considering that it has its path in the range [0,1] but it is additionally object of a transformation, for example, a linear transformation.

For the same reason, exchanging the reference open with closed is also equivalent to considering that the bijective transformation has a negative sign. Due to the mentioned reasons, it is understood that any way of establishing a variable adopting values in a specific range for establishing the degrees of aperture between the maximum and the minimum are equivalent to making use of a parameter having its path in the range [0,1], as throughout this description and the claims.

Each of the zones also has a sensor providing a signal indicative of the temperature read in said zone. Each of these sensors feeds an input of a central processing unit. This central processing unit also receives as an input the set point temperature values of each zone. These set point values are the values which the air conditioning system must tend to achieve individually.

This central processing unit carrying out the regulation method according to the invention provides outputs controlling each of the valves for managing each of the zones and an output modifying the behavior of the thermal cycle machine.

The method is defined from the following steps performed iteratively while regulation is carried out:
  processing the temperature signals comprising the following steps:
    establishing the value of a coefficient $C_t$ associated with the degree of aperture of the plurality of valves, initially taking the value 0, where the value equal to 0 means that all the valves are closed and the value 1 means that all the valves are open,
    for each zone i=1 . . . n, verifying the value of the error between the set point temperature and the measured temperature $|Tc_i-Tz_i|$, such that if said error is greater than a predetermined threshold value $H_T$, then the degree of aperture of the i-th valve is modified by means of a signal acting in the adjustable actuator according to the formula $A_i=f_t(Tc_i-Tz_i)$, $f_t$ being an increasing function limited between 0 and 1; and the accumulated value of the coefficient $C_t$ increases with the value $A_i/n$,
    providing a $C_t$-dependent signal in the interface of the thermal cycle machine for specifying the machine air fan speed $V_m$, the machine set point temperature $T_m$; or both.

In each iteration, the difference between the set point temperature and the measured temperature is assessed for each zone. In a specific zone, if the difference in absolute value is greater than a pre-established threshold value, then it is understood that the temperature must be corrected.

Assuming as a particular example that the environmental conditions are excess heat conditions and the thermal cycle machine is operating generating cold. If the temperature of a specific i-th zone is close enough to the set point temperature, then it is not necessary to correct the temperature. If in contrast this difference exceeds the threshold value, then the valve corresponding to the outlet of the i-th zone must be open to provide cold. It is understood that the set point temperatures in this case must always be above the temperature provided by the machine in cold mode, so that the objective, which is to bring the existing temperature closer to the set point temperature, is achieved by providing air. For this reason, in one embodiment the sign of the argument of the measured error in absolute value is taken into account for changing the behavior of the thermal cycle machine, such that it can change from generating cold to generating heat.

The degree of aperture of the valve will depend on the degree of separation between the set point temperature and the measured temperature, requiring that the dependence between one variable and another is by means of an increasing function. The simplest increasing function is a linear function with a positive slope, nevertheless, it is possible to use power functions giving rise to different degrees of response according to the degree of divergence between the set point temperature and the measured temperature.

The degree of aperture $A_i$ establishes the actuation that can be carried out by the central processing unit on the valve managing the i-th zone. Nevertheless, it is also used for calculating a global accumulated value $C_t$. Given that the values $A_i$ with i=1 . . . n are limited between 0 and 1, the amount $$C_t = \sum_{i=1}^{n} A_i/n = \frac{1}{n}\sum_{i=1}^{n} A_i$$

is also limited between 0 and 1.

The accumulated variable $C_t$ is what allows determining the thermal cycle machine fan speed, its set point temperature or both, given that this accumulated variable is indicative of the global needs of all the zones. For example, if the variable $C_t=0$, it means that each of the measurements has given rise to $A_i=0$. In this case, all the valves will be closed and it would not be necessary for the thermal cycle machine to be operating. In this particular case even the central processing unit can order the thermal cycle machine to stop.

If in contrast the variable $C_t=1$, it means that each of the measurements has given rise to $A_i=1$. In this case, the needs in each zone are maximum. All the valves will have been opened and the machine must successfully supply a flow which allows bringing the measured temperatures closer to the set point temperatures, correcting said deviation.

The particular ways of establishing the dependences between variables and a more complex control, using additional variables such as pressure and thermal inertia, will be described below in the detailed description of the invention using drawings and diagrams.

DESCRIPTION OF THE DRAWINGS

These and other features and advantages of the invention will be more clearly understood from the following detailed description of a preferred embodiment, given only by way of illustrative and non-limiting example in reference to the attached drawings.

DETAILED DESCRIPTION OF THE INVENTION

The present invention is a regulation method for regulating an air conditioning system suitable for conditioning the temperature of a set of n zones.

The zones do not necessarily have to correspond to rooms demarcated by walls such that they are compartmentalized. It is possible to define different zones for example in a large room which have different set point temperatures in the operating mode, and said zones are not demarcated by physical separations.

In the embodiment to be described based on the drawings, a system carrying out management in accordance with a first aspect of the invention has been considered, in which the temperatures of each of the zones are taken into account; and in accordance with a particular way of regulating where the pressure as well as thermal inertia are also taken into account.

Figure 1:
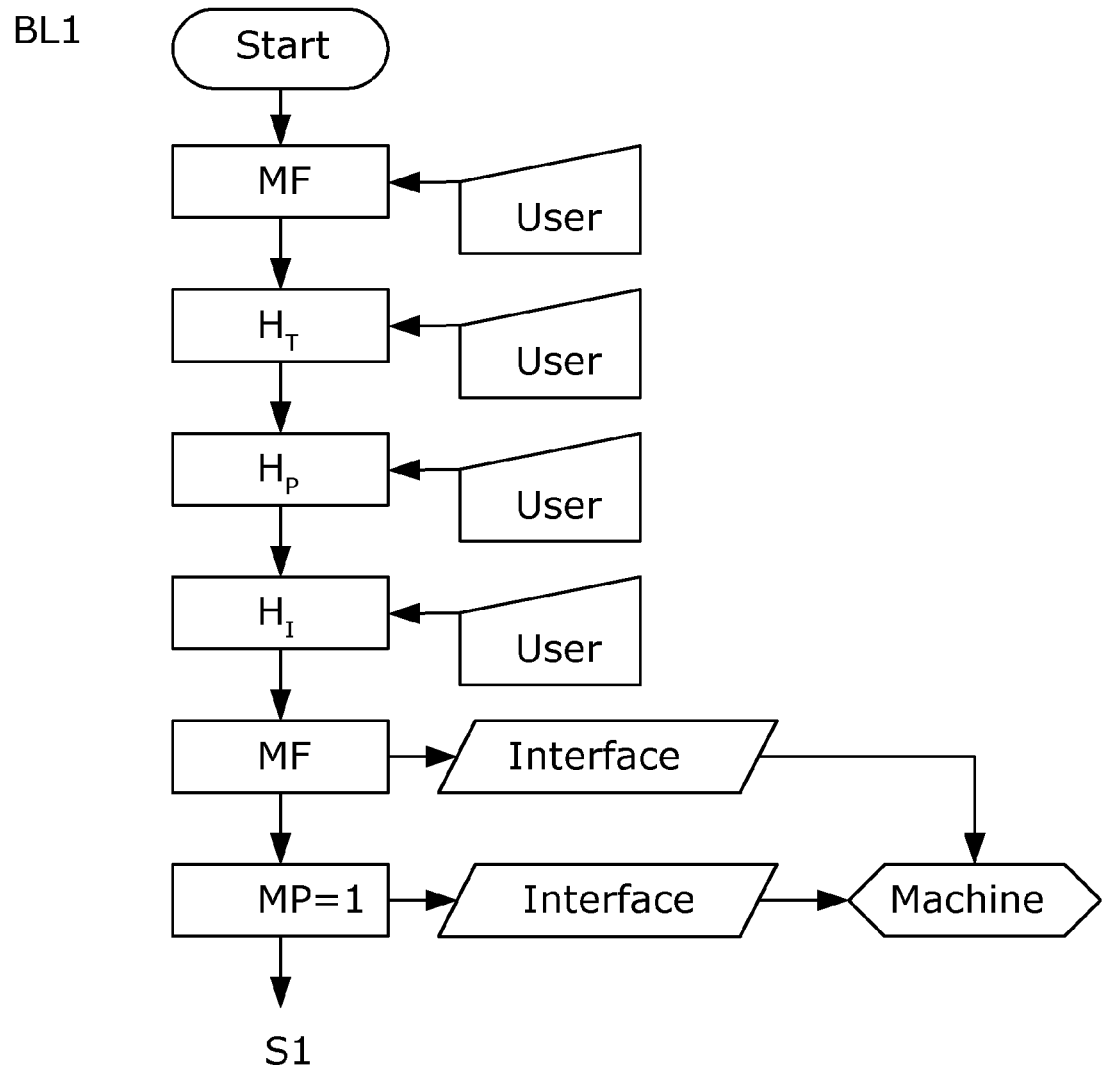
FIG. 1 This figure shows an embodiment of a first variable initialization block BL1 for carrying out an example of controlling an air conditioning system.

FIG. 1 schematically shows a first block BL1, where a set of variables that will be used in control blocks which will be described below is initialized. This variable initialization block BL1 comprises the following variables introduced by the user:

MF, specifying the operating mode of the thermal cycle machine, taking the value −1 to indicate that the machine generates cold and 1 if it is established that the machine generates heat;

$H_T$ is the threshold value predetermined by the user as the value from which the difference in a zone between the set point temperature and the read temperature is enough for the system to take corrective measures, $H_p$ is the threshold value predetermined by the user as the value from which the difference inside the distributor between the set point pressure and the read pressure is enough for the system to take corrective measures, $H_I$ is the threshold value predetermined by the user as the value from which the difference in a zone between the set point temperature and the read temperature in thermal inertia management is enough for the system to take corrective measures.

The MF value and the MP, the variable indicating if the machine must be operating or stopped, are introduced in the thermal cycle machine. In this particular case, it takes the value 1 when the machine is switched on and 0 when the machine is stopped. The indication S1 only reflects the direction of the flow of running the steps followed in the method, such that in FIG. 5 it is possible to identify the relationship between the different blocks that are described individually.

Figure 2:
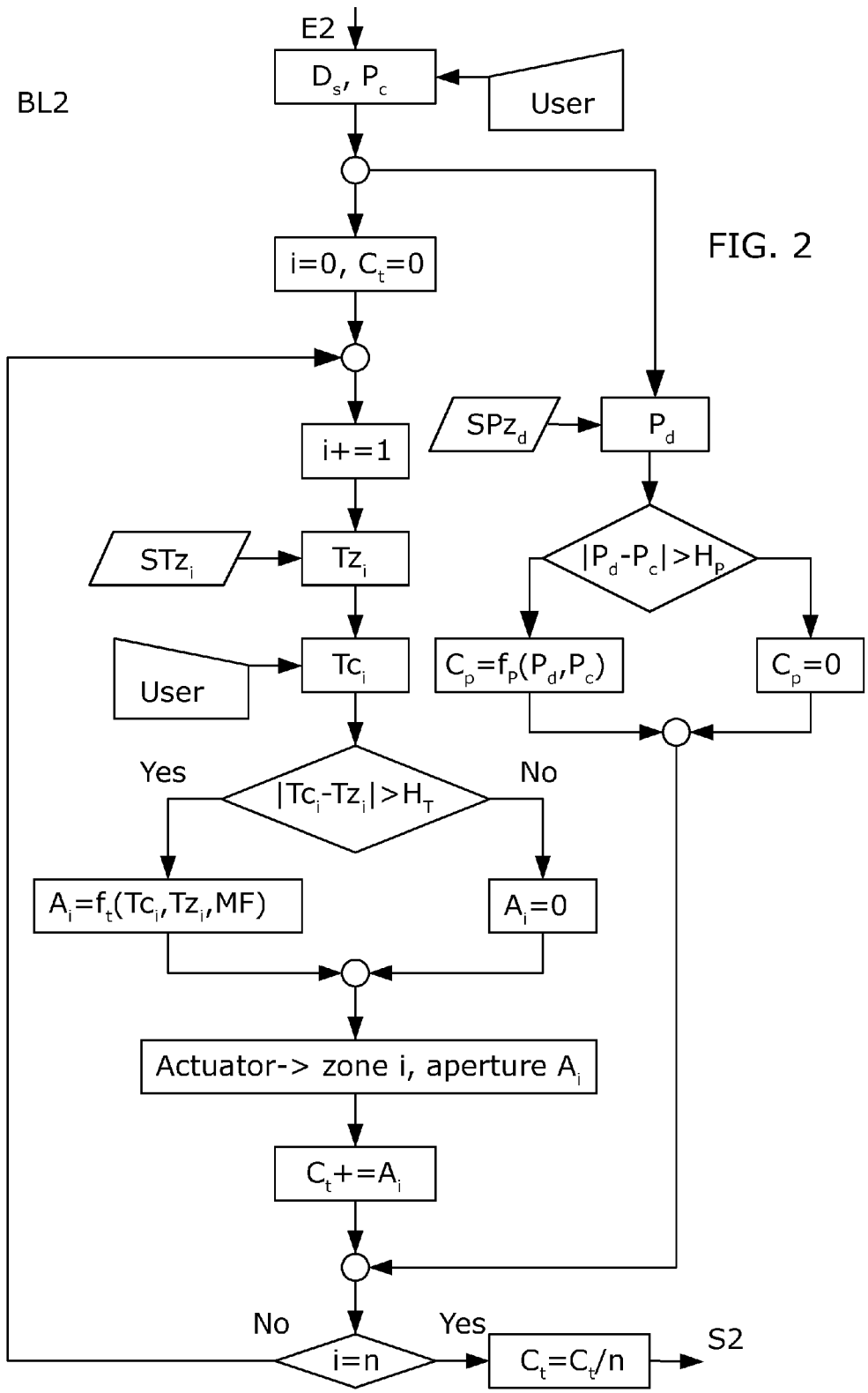
FIG. 2 This figure shows an embodiment of a second temperature and pressure control block BL2 for managing the air conditioning in n number of zones.

Once the indicated variables have been initialized, in this embodiment an iterative method of managing the temperature the steps of which are shown in the second block BL2 of FIG. 2 is carried out. This iterative method is run with a frequency $D_S$ such that it is understood that the steps comprised in the iterative method can be carried out in less time, and a wait time is established upon reaching the end of the loop such that the frequency of running the entire loop gives rise to the frequency $D_S$.

Given that in this embodiment pressure will also be managed in addition to temperature, in the same step, the user also establishes the set point pressure $P_c$.

Even though the diagram shown in the second block BL2 of FIG. 2 shows two temperature and pressure management loops, the temperature management loop will first be described followed by the pressure management loop.

The temperature management loop passes through all the zones, hence the index i initially takes the value 0 and is used as a meter to verify that all the zones have been evaluated. The variable $C_t$ is also set to zero, where the accumulated value of the degree of aperture of the valves is included, where each valve is in turn what establishes the degree of flow supply coming from the thermal cycle machine to each zone. If a zone reaches the set point temperature, it is not necessary to condition same by supplying air coming from the machine, and therefore the valve of that zone remains closed. To carry out this actuation, the second block BL2 shows the branch of steps on the left where, after increasing the meter i of zones by one unit, reading of the temperature probe or sensor $STz_i$ is performed establishing the reading value $Tz_i$. The read temperature value $Tz_i$ is compared to the set point temperature value introduced by the user $Tc_i$, such that if the difference in absolute value is greater than the threshold value $H_T$, then a degree of aperture $A_i$ of the valve is established allowing the air outlet for air coming from the thermal cycle machine to the i-th zone. The degree of aperture $A_i$ of the valve in function of the difference in temperatures is an increasing function, such that the greater the difference the higher the degree of aperture of said valve. If the difference in temperatures does not exceed the threshold $H_T$, then it is established that the degree of aperture $A_i$ of the valve takes the value 0. Having established the degree of aperture of the valve, the method acts on said valve so that the aperture is that determined by the value $A_i$.

In the next step, the variable $C_t$ increases with the value of the degree of aperture $A_i$ of the valve i-th. In block BL2, the increment operator "+=", used for example in C programming language, is used to denote that the variable on the left thereof increases with the value located on the right of said operator.

The iterative loop ends when the n zones have been passed through and it is when the accumulated value is divided by n, such that if the degree of aperture $A_i$ of each valve is a variable which takes values between 0 and 1, then the variable $C_t$ also takes values between 0 and 1, regardless of the number of zones.

This variable normalization measure allows a simple programming of algorithms carrying out this method and does not require taking scaling factors into account. If on contrast this scaling is not carried out, it is understood that this very method is being carried out in an equivalent manner, provided that the minimum and maximum value of each variable is taken into account.

In this embodiment, the temperature control loop in accordance with the first aspect of the invention is carried out in parallel along with another management loop, the pressure management loop.

The pressure loop carries out a reading of the pressure $P_d$ inside the distributor by means of the pressure sensor $SP_d$. The value of the pressure is compared to the set point value $P_c$, such that if the difference in absolute value exceeds the predefined threshold value $H_p$, then a factor $C_p$ is calculated. If the difference in absolute value does not exceed said threshold $H_p$, then the factor $C_p$ takes the value 0.

In this embodiment, the function $f_p$ that relates the value $C_p$ with respect to its arguments, pressure measured inside the distributor and set point pressure, is a decreasing function. The closure of the valves of the zones which are not in demand, means that the difference between these pressures is greater, which indicates that a flow more than that necessary is being introduced into the zones that are in demand. Therefore, it is possible to reduce the fan speed of the thermal cycle machine, for example.

Generally, the parameters $C_t$ and $C_p$ are the parameters provided by the second block BL2 to be subsequently used in introducing signals in the interface of the thermal cycle machine, suitably modifying the set point temperature, the fan speed or both variables.

The actuations on elements of the air conditioning system are therefore two in number, a first actuation of managing the valves in each iterative loop; and a second actuation outside the iterative loop on the thermal cycle machine through its interface and with the accumulated values obtained in such iterative loops.

Figure 3:
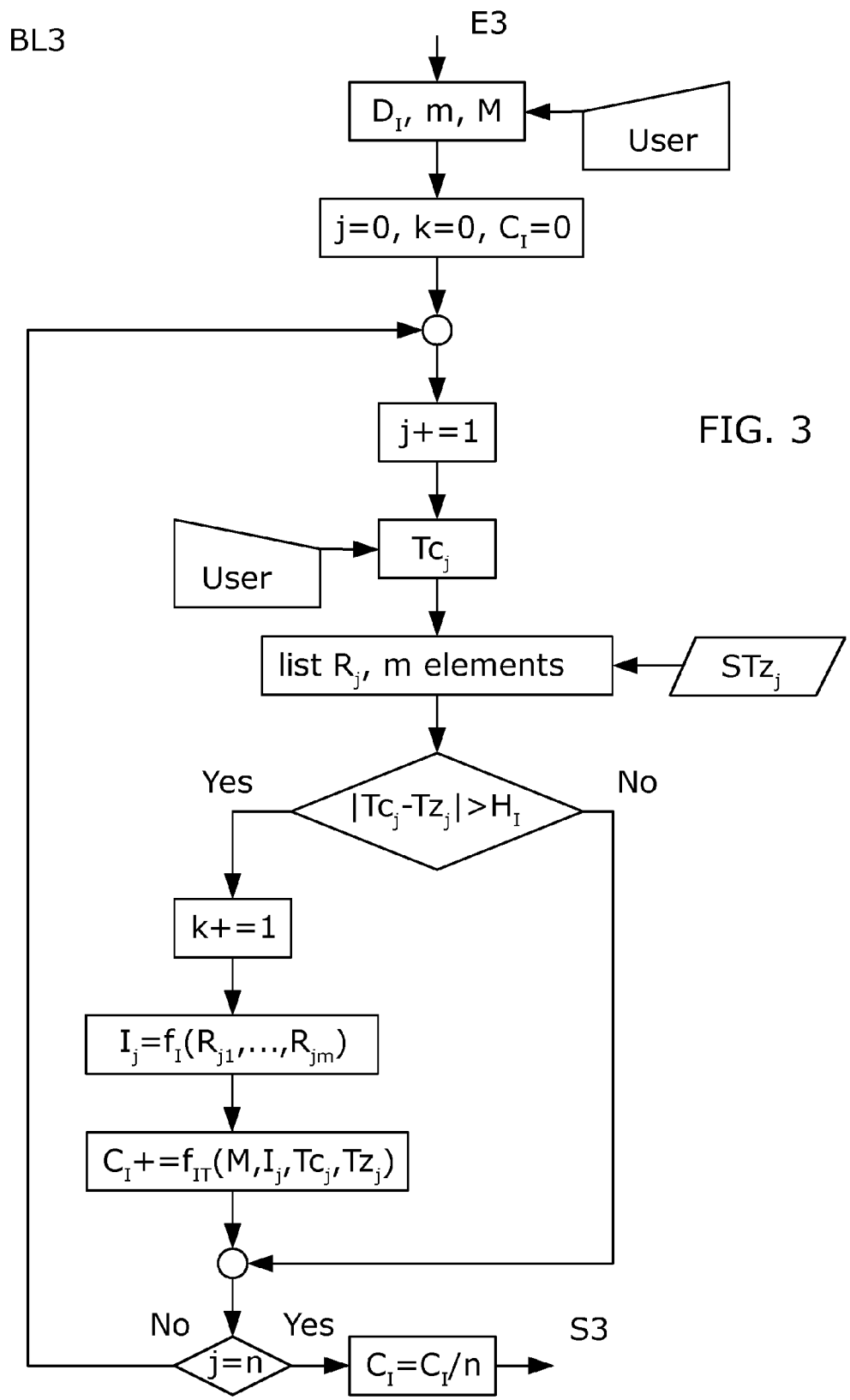
FIG. 3 This figure shows an embodiment of a third temperature control block BL3 taking the effects of thermal inertia in each of the zones into account.

FIG. 3 shows a third block BL3 dedicated to thermal inertia management. The corrections due to thermal inertia are carried out on zones that do not suitably respond over time and require a higher actuation level, i.e., greater airflow coming from the thermal cycle machine.

Even though the control loops of the second block BL2 have a specific frequency $D_S$, this third block BL3 primarily made up of a thermal inertia management loop requires specifying a frequency $D_I$ which, in principle, is different from the frequency $D_S$ of the second block BL2.

Two parameters, m and M, are also specified by the user. The thermal inertia is established by carrying out a plurality of readings of the temperature over time. The parameter m is the maximum number of records. M is a multiplicative factor for correcting thermal inertia which will intervene in the formulas that will be detailed below.

In this embodiment, the records are stored in a list $R_j$ of m elements, where j is now the index indicating the j-th zone. Therefore, the list of m elements in the j-th zone can be denoted with two sub-indexes as $R_{j1}, \ldots, R_{jm}$ The index k will also be used in this third block. This index k will be used for counting the zones that do not behave appropriately due to thermal inertia problems. In a first step, the index j, the index k and the coefficient that will store an accumulated value $C_I$ take the initial value 0.

The loops passes through all the zones, hence the first passage of the interior of the loops increases the meter j. The set point temperature value is specified by the user. Although this input is inside the loop, the user can specify it only once. The temperature sensor $STz_j$ is what supplies the readings that generate the list of m records. Although the list has these m records, the formulas using these records to determine if there are thermal inertia problems do not necessarily have to use the m records, rather it can use a subset thereof.

The existence of thermal inertia problems is established provided that the temperature of the j-th zone differ from the set point temperature $Tc_j$ by a value greater than the pre-established threshold value $H_i$. In this case, the zones where there are thermal inertia problems are further established by carrying out the following assessments:

the value of the exponential factor for correction due to thermal inertia $I_j = f_I(R_{j1}, \ldots, R_{jm})$ is estimated, $f_I$ being a function on the set of m values $R_{j1}, \ldots, R_{jm}$ or a subset thereof; and the value of the temperature evolution over time $C_j = f_{IT}(M, I_j, Tc_j, Tz_j)$ is calculated, where the values $I_j$, $Tz_j$ and $Tc_j$ can be of any of the m records, $R_{j1}, \ldots, R_{jm}$, counting the number k of sensors to which an error greater than said threshold $H_i$ corresponds.

In this embodiment, the exponential factor for correction due to thermal inertia $I_j$ is calculated before comparing the set point temperature $Tc_j$ and the temperature of the j-th zone, because if the value of this comparison is less than the pre-established threshold value $H_i$, then the value of $Tz_j$ would not be saved in the record $R_j$ such that said value would not be available in the following passages of time. Only values that are far enough from the set point temperature $Tc_j$ would be available.

Once the n zones have been reviewed, the coefficient $C_I$ is calculated as $$C_I = \frac{1}{k} \Sigma_{j=1}^{n} C_j.$$

Figure 4:
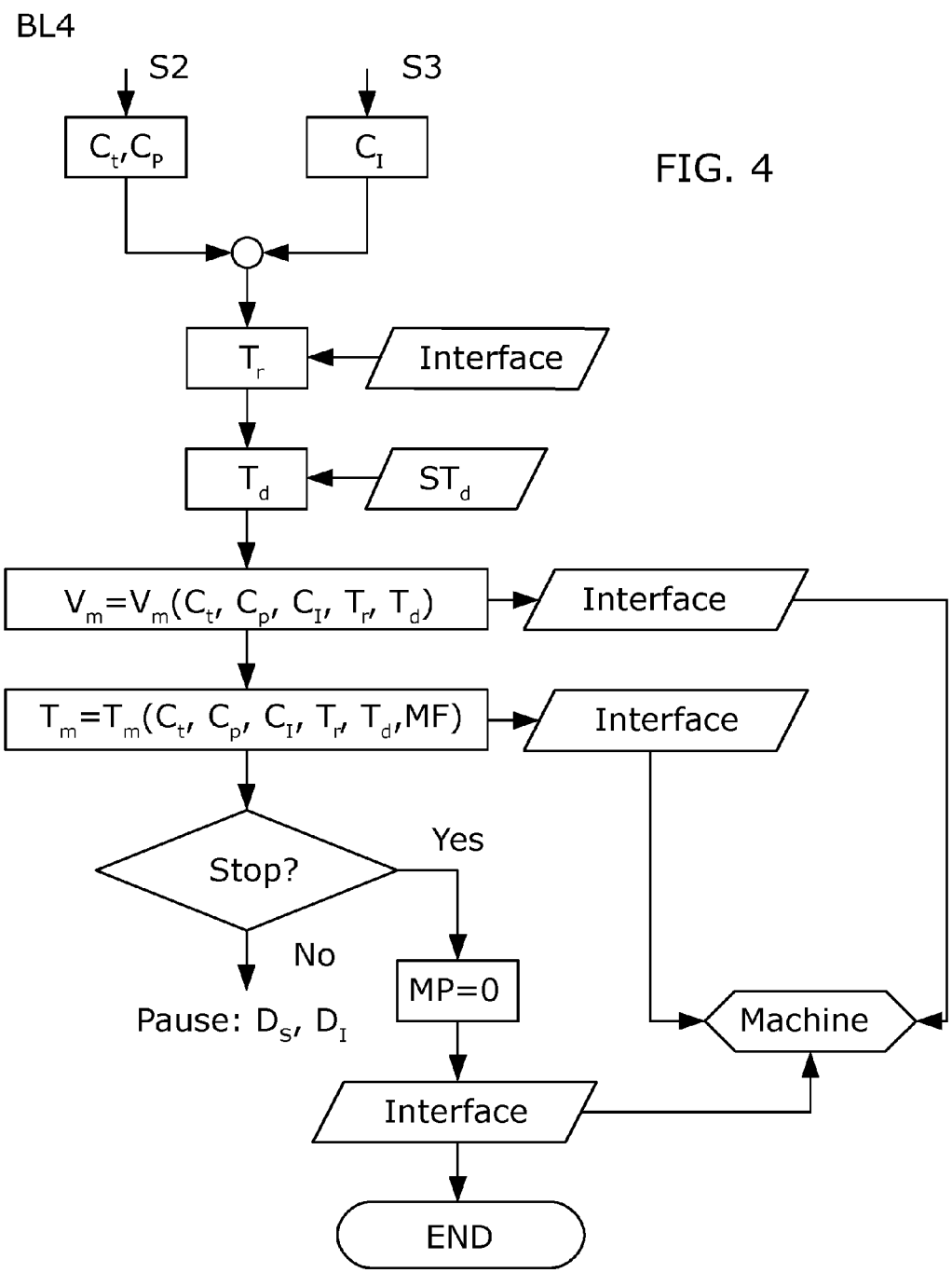
FIG. 4 This figure shows an embodiment of a fourth machine control block BL4 for controlling the machine through its interface for the actuation of various parameters.

FIG. 4 depicts a fourth block BL4 that includes the modes of actuation on the thermal cycle machine from the accumulated factors calculated in blocks BL2 and BL3.

According to the invention, the second block BL2 only carries out temperature management and would provide the coefficient $C_t$. In this embodiment, in addition to basic temperature management, the second block BL2 also incorporates a pressure correction loop and provides the coefficient $C_p$. The third block BL3 provides the coefficient $C_I$.

In this embodiment, it has also been taken into account that the machine is fed with return air with temperature $T_r$, and furthermore the temperature inside the distributor $T_d$ is used. For reading the temperature in the distributor, a temperature sensor $ST_d$ has been incorporated inside said distributor.

In the fourth block BL4, it is indicated that the fan is acted on by varying its speed $V_m$ and therefore in the outlet air discharge, on the machine set point temperature $T_m$ or on both. The values taken by one variable and another in function of the received signals will be specified below.

It is possible that the parameters establish the need to stop the thermal cycle machine. In this case, the variable MP takes the value 0 and is introduced in the machine. Otherwise, the value of the frequencies $D_S$ and $D_I$ is reviewed before returning to the control blocks BL2 and BL3.

Figure 5:
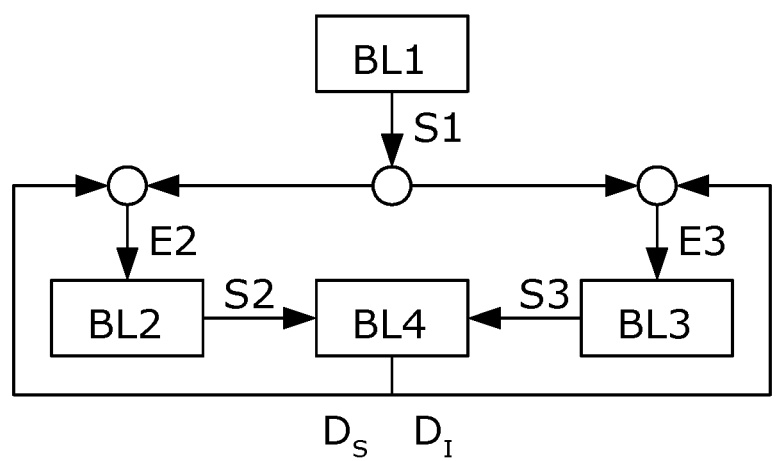
FIG. 5 This figure shows an embodiment in which the four control blocks are combined for managing the entire air conditioning system.

FIG. 5 shows a general diagram in which the operation of the different described blocks is integrated. The first variable initialization block BL1 is run at the start of the control method. With the variables initialized, particularly the frequencies $D_S$ and $D_I$, blocks BL2 and BL3 are run in parallel. The blocks can carry out actions on the actuators of the system, it has particularly been seen that the second block BL2 acts on the air outlet valves for air coming from the thermal cycle machine to the i-th zone. The outputs S2 and S3 shown in FIG. 5 indicate the accumulated values $C_t$, $C_p$ and $C_I$.

The fourth block BL4 is what establishes the values of actuation on the thermal cycle machine through its interface.

Having described the overall behavior of the method, various embodiments are described considering mathematical expressions that have been proven suitable for the operation of the air conditioning system. Even though the functions are detailed by means of mathematical functions, the values taken by the mathematical expressions of such functions can be reproduced by means of various numerical methods such as polynomial approaches or by means of storing value tables for a specific range of values and with interpolation for the values that are not explicitly in said tables.

In all these cases in which an alternative expression or a way to provide a function with equal image values is sought, equal being understood as the difference between the original function and the substitute function being limited by a pre-established value of the error, it is understood that the described method is implemented in an equivalent manner.

The first parameter established in the interface of the machine is the fan speed $V_m$. The fan speed is specified in the interface by means of the value $V_m = f_{vm}(C_t, C_p, C_I, T_r, T_d)$ where the function $\eta_{vm}$ can be generically expressed as $$f_{vm}(C_t, C_p, C_I, T_r, T_d) = d_1 C_t^{d_2} + d_3 C_p^{d_4} + d_5 C_I^{d_6} + d_7 |T_r - T_d|^{d_8}$$

where $C_t$ is the coefficient associated with the degree of aperture of the plurality of valves by temperature, $C_p$ is the coefficient associated with the degree of aperture of the plurality of valves due to the effect of pressure if it is evaluated, $C_I$ is the coefficient associated with thermal inertia if it is evaluated; and $T_r$ and $T_d$ are the temperatures of the return air and of the air inside the distributor respectively, if they are both evaluated, where coefficients $d_i$, i=1 . . . 8 are positive and take any of the following particular values:

either $d_3=0$, $d_5=0$, $d_7=0$, and $d_2=1$, such that the control is directly proportional to the coefficient associated with the degree of aperture of the plurality of valves by temperature, resulting in $f_{vm}(C_t) = d_1 C_t$, or $d_5=0$, $d_7=0$, $d_2=1$ and $d_4=1$, such that the control is directly proportional to the variables $C_t$ and $C_p$, resulting in $f_{vm}(C_t, C_p) = d_1 C_t + d_3 C_p$, or $d_5=0$ such that the control does not take thermal inertia into account, resulting in $f_{vm}(C_t, C_p, T_r, T_d) = d_1 C_t^{d_2} + d_3 C_p^{d_4} + d_7 |T_r - T_d|^{d_8}$ or $d_3=0$, such that the control does not take the change in pressure into account, resulting in $f_{vm}(C_t, C_I, T_r, T_d) = d_1 C_t^{d_2} + d_5 C_I^{d_6} + d_7 |T_r - T_d|^{d_8}$ or all the coefficients $d_i$, i=1 . . . 8 are not nil.

The second parameter established in the interface of the thermal cycle machine is the set point temperature $T_m$. The set point temperature is specified in the interface by means of the value $T_m = f_{Tm}(C_t, C_p, C_I, T_r, T_d, MF)$, where the function $f_{Tm}$ is generically expressed as $$f_{Tm}(C_t, C_p, C_I, T_r, T_d, MF) = e_1(T_r + MF \cdot C_I)^{e_2} + MF \cdot (e_3 C_t^{e_4} + e_5 C_p^{e_6} + e_7(MF \cdot (T_d - T_r))^{e_8})$$

where MF is a variable taking the value —1 distinguishing if the machine generates cold and 1 if it generates heat, the coefficients $e_i$, i=1 . . . 8 are positive and take any of the following particular values:

either $e_3=0$, $e_5=0$ and $e_7=0$, such that the control obtains the machine set point temperature from the return temperature corrected by the inertia of the zones, resulting in $$f_{Tm}(C_I, T_r) = e_1(T_r + MF \cdot C_I)^{e_2}$$

or $e_5=0$, such that the control does not take the effect of the change in pressure inside the distributor into account, resulting in $$f_{Tm}(C_t, C_I, T_r, T_d) = e_1(T_r + MF \cdot C_I)^{e_2} + MF \cdot (e_3 C_t^{e_4} + e_7(MF \cdot (T_d - T_r))^{e_8})$$

or $e_7=0$, such that the control does not take the change in temperature between the inlet and the outlet of the machine into account, resulting in $$f_{Tm}(C_t, C_p, C_I, T_r) = e_1(T_r + MF \cdot C_I)^{e_2} + MF \cdot (e_3 C_t^{e_4} + e_5 C_p^{e_6})$$

or all the coefficients $e_i$, i=1 . . . 8 are not nil.

Even though it is indicated that MF is a variable taking the values −1 or 1, the variable can take any pair of values capable of distinguishing two states. A common way to represent these two values is by using an implementation of logic variable types adopting the "true" or "false" value. Any of these ways of representation is considered equivalent.

Examples of implementing the third block BL3 have also been carried out, taking thermal inertia into account. In this case, the value of the exponential factor for correction due to thermal inertia $I_j = f_I(R_{j1}, \ldots, R_{jm})$ for a specific value j used in calculating the value of correction due to thermal inertia can be expressed as $I = f_I(R_1, \ldots R_m) = f_I(Tz_1, \ldots, Tz_m)$, where $$f_I(Tz_1, \ldots, Tz_m) = \frac{b_0}{m-1} \left| \sum_{s=2}^{m} b_{s-1} \cdot (Tz_{s-1} - Tz_s) \right|^{b_m}$$

and where the coefficients $b_i$, i=1 . . . 8 are positive and take any of the following particular values:

either $b_1 = b_2 = \ldots = b_{m-1} = m-1$ and $b_m = 1$, such that the control is proportional to the difference between the first and last temperature record of the zone, resulting in $$f f_I(Tz_1, \ldots, Tz_m) = f f_I(Tz_1, Tz_m) = b_0 |Tz_1 - Tz_m|$$

or $b_1 = b_2 = \ldots = b_{m-1} = m-1$ and $b_m = 0.5$, such that the control is proportional to the square root of the difference between the first and last temperature record of the zone, resulting in $$f_I(Tz_1, \ldots, Tz_m) = f_I(Tz_1, Tz_m) = b_0 |Tz_1 - Tz_m|^{0.5}$$

or all the coefficients $b_i$, i=1 . . . m are not nil.

Once the value of the exponential factor for correction due to thermal inertia is established, it is possible to calculate the value of temperature evolution over time $f_{IT}(M, I_j, Tc_j, Tz_j)$, for a specific value j, and it can be expressed as $$f_{IT}(M, I_j, Tc_j, Tz_j) = M^{I_j}|Tc_j - Tz_j|^{c_1}$$

where M is the multiplicative factor for correcting thermal inertia, $I_j$ is the exponential factor for correction due to thermal inertia, $Tc_j$ and $Tz_j$ are the set point temperature and zone temperature, respectively, and the coefficient $c_1$ is positive and takes any of the following particular values:
either $c_1=1$, such that the control is proportional to the difference between the set point temperature and the zone temperature, resulting in $$f_{IT}(M, I_j, Tc_j, Tz_j) = M^{I_j}|Tc_j - Tz_j|$$

or $c_1=2$, such that the control is proportional to the square of the difference between the set point temperature and the zone temperature, resulting in $$f_{IT}(M, I_j, Tc_j, Tz_j) = M^{I_j}|Tc_j - Tz_j|^2$$

or $c_1=0.5$, such that the control is proportional to the square root of the difference between the set point temperature and the zone temperature, resulting in $$f_{IT}(M, I_j, Tc_j, Tz_j) = M^{I_j}|Tc_j - Tz_j|^{0.5}$$

or $c_1$ is a positive value other than 0.5, 1, or 2.

An increasing function has been used in the second block BL2 with respect to the difference in temperatures. Generally, the degree of aperture of the i-th zone can be expressed as $A_i = f_t(Tc_i, Tz_i, MF)$, and particularly $f_t$ being dependent on the difference in temperatures $Tc_i - Tz_i$, i.e., $$A_i = f_t(Tc_i - Tz_i, MF)$$

where MF is a variable taking the value $-1$ distinguishing if the machine generates cold and 1 if it generates heat, $Tc_i$ and $Tz_i$ are the set point temperature and the room temperature of the i-th zone, respectively. The function $f_t$ can be expressed as $$f_t(Tc_i, Tz_i, MF) = \begin{cases} a_1(Tc_i - Tz_i)^{a_2} & \text{Si } Tc_i \geq Tz_i \text{ y } MF = 1 \\ -a_1(Tc_i - Tz_i)^{a_2} & \text{Si } Tc_i < Tz_i \text{ y } MF = -1 \end{cases}$$

where the coefficients $a_1$ and $a_2$ are positive and take any of the following particular values:
either $a_2=1$, such that the control is proportional to the difference between the set point temperature and the zone temperature, resulting in $$f_t(Tc_i, Tz_i, MF) = \begin{cases} a_1(Tc_i - Tz_i) & \text{Si } Tc_i \geq Tz_i \text{ y } MF = 1 \\ -a_1(Tc_i - Tz_i) & \text{Si } Tc_i < Tz_i \text{ y } MF = -1 \end{cases}$$

or $a_2=2$, such that the control is proportional to the square of the difference between the set point temperature and the zone temperature, resulting in $$f_t(Tc_i, Tz_i, MF) = \begin{cases} a_1(Tc_i - Tz_i)^2 & \text{Si } Tc_i \geq Tz_i \text{ y } MF = 1 \\ -a_1(Tc_i - Tz_i)^2 & \text{Si } Tc_i < Tz_i \text{ y } MF = -1 \end{cases}$$

or $a_2=0.5$, such that the control is proportional to the square root of the difference between the set point temperature and the zone temperature, resulting in $$f_t(Tc_i, Tz_i, MF) = \begin{cases} a_1(Tc_i - Tz_i)^{0.5} & \text{Si } Tc_i \geq Tz_i \text{ y } MF = 1 \\ -a_1(Tc_i - Tz_i)^{0.5} & \text{Si } Tc_i < Tz_i \text{ y } MF = -1 \end{cases}$$

or all the coefficients $a_i$, $i=1, 2$ are not nil.

The preceding comment concerning the variable MF taking two possible values or states is applicable to this case for calculating the function $f_t$.

Different control blocks use the calculation of the difference between the set point temperature of the i-th zone and the temperature measured in the i-th zone, to compare it to a threshold value if the machine is working providing cold and the temperature is above the set point temperature, the method will act such that the airflow delivered by the thermal cycle machine acts by correcting said temperature. The same occurs if the machine produces heat and the measured temperature is below the set point temperature. The measured error in absolute value coincides with said difference and the method will also act by supplying a specific proportion of air driven by the machine for correcting the temperature.

Nevertheless, when the machine produces cold but the temperature is below the set point temperature; or likewise, if the machine produces heat but the temperature is above the set point temperature, supplying greater airflow coming from the machine does not correct this situation.

According to one embodiment, the method assesses the sign of the difference in temperatures to determine from this sign if it is necessary to change the working mode of the thermal cycle machine.

Figure 6:
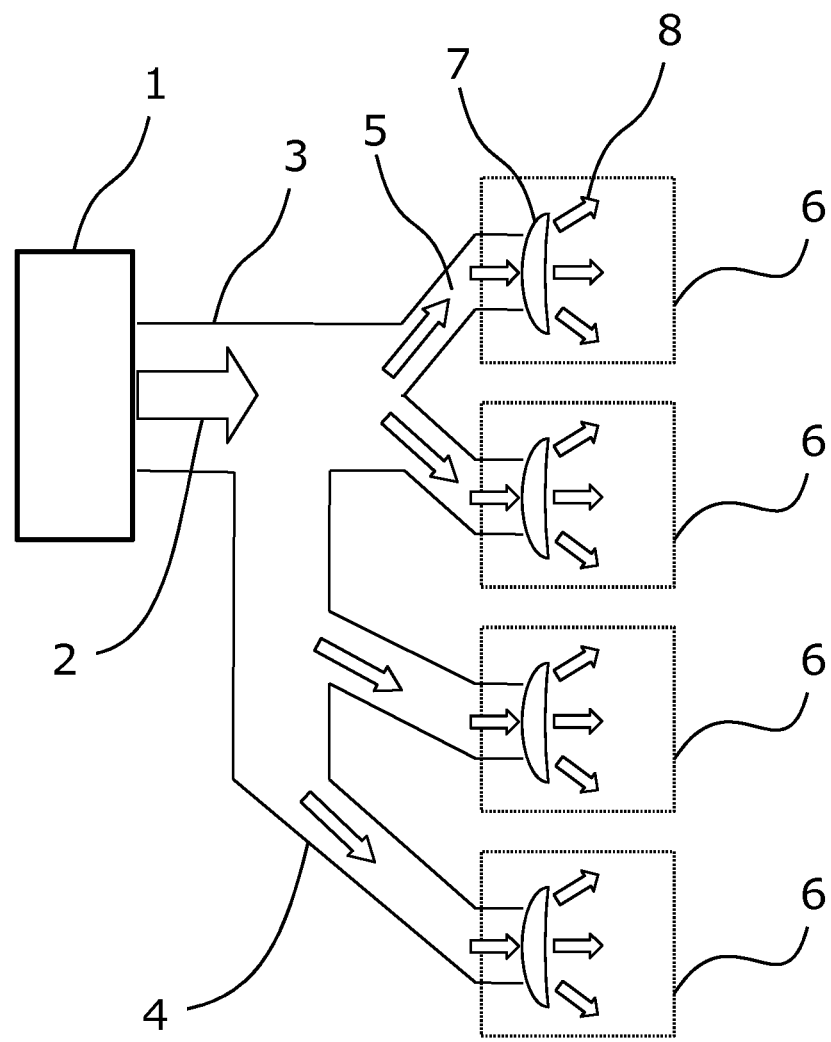
FIG. 6 This figure shows an example of the state of the art, where a specific number of zones is conditioned from a thermal cycle machine.

FIG. 6 shows a diagram of a conventional installation in accordance with the state of the art. A thermal cycle machine (1) provides at its outlet an air discharge (2) towards an installation formed by conduits (3, 4) distributing the discharge of the thermal cycle machine. For example, it can be seen how the discharge (5) of one of the peripheral branches of the conduits (4) feeds a specific zone (6), represented by means of an area or region demarcated by a dotted line, and flows into said area or region through a diffuser element (7) such that the airflow (8) is propagated throughout the entire zone (6). This very situation is repeated for all the zones.

Figure 7:
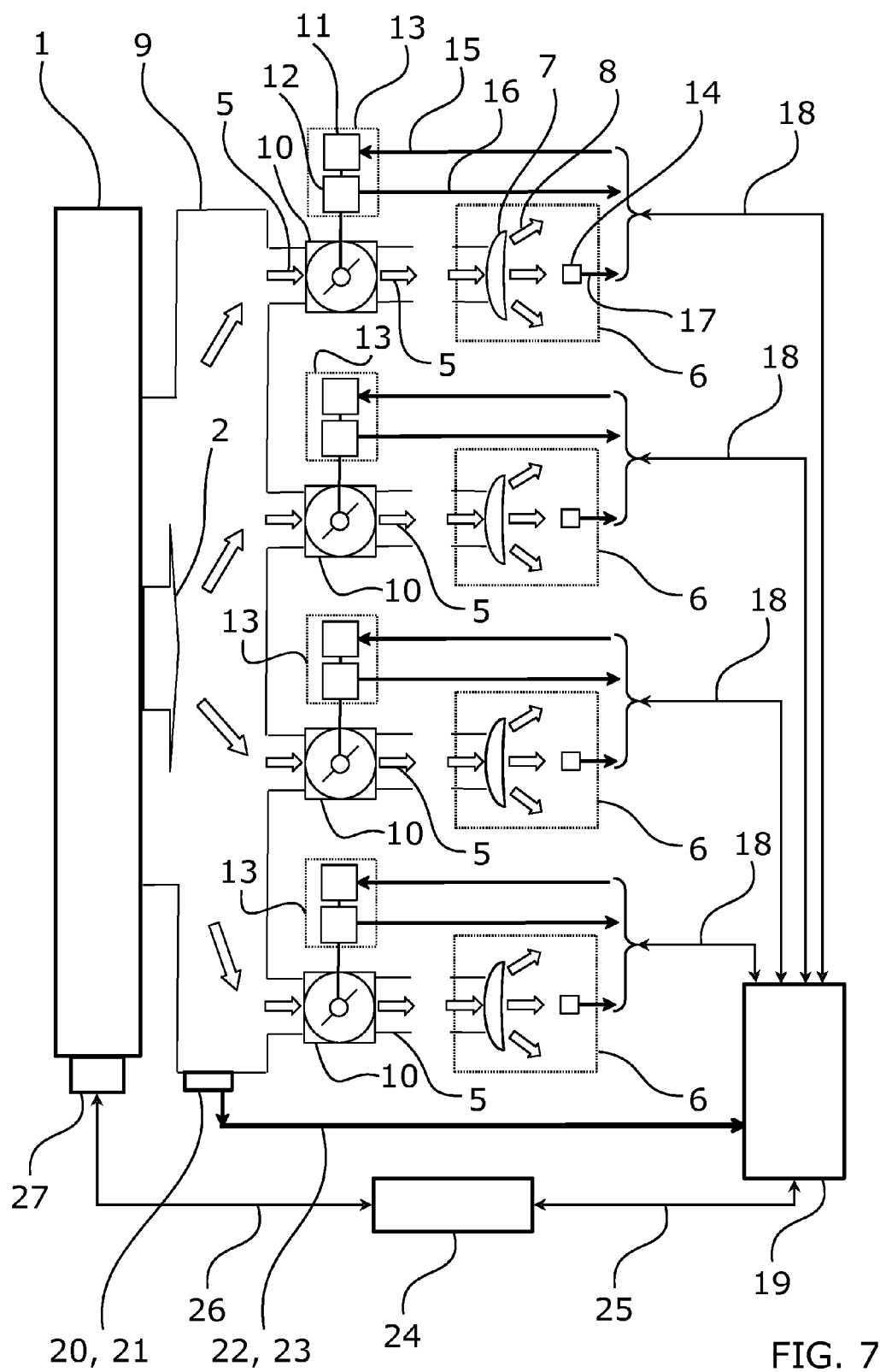
FIG. 7 This figure shows a diagram of the embodiment of the invention showing an implementation of the method and of the system which allows carrying out the control method.
Figure 8:
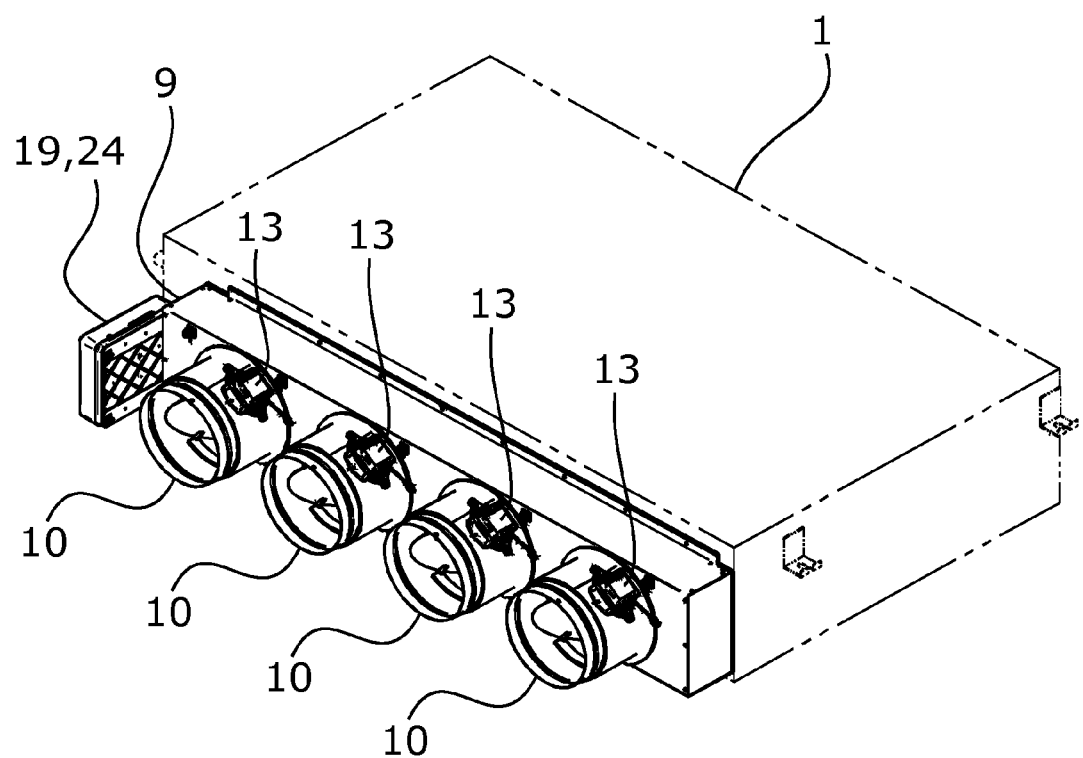
FIG. 8 This figure shows an embodiment of a distributor integrating all the valves for managing each of the zones as well as the pressure sensor.

FIG. 7 shows an embodiment of the invention, formed by a system comprising a central processing unit suitable for carrying out the method according to any of the described examples. This figure shows the thermal cycle machine (1) supplying an air discharge (2), said discharge flows into a distributor (9). In this embodiment, the distributor element (9) is formed by a different compartment that gives rise to an installable apparatus. This apparatus is suitable for installations which use flexible conduits. Nevertheless, the distributor (9) can be formed by the set of cavities and rigid conduits channeling the air from the thermal cycle machine (1) to the outlets which allow providing air to the zones (6). The particular configuration of the distributor (9) formed by a single element is shown in FIG. 8. This distributor (9) comprises:
an inlet coupled precisely to the outlet of the thermal cycle machine (1), this attachment being perfectly leak-tight,
a plurality n of outlets for conditioning a plurality of zones (6), where each of the outlets $i=1 \ldots n$ in turn comprises a valve (10) with an adjustable actuator (13) that can be adjusted according to a degree of aperture $A_i$.

In this embodiment, the valves (10) are gate valves and regulate the flow or discharge (5) going towards each of the zones (6). Said discharge (5) flows into each zone (6) through a diffuser element (7), such that the airflow (8) is propagated throughout the entire zone (6). The gate valve (10) is operated by a motor (11) and its position is monitored by a position sensor (12). The assembly formed by the motor (11) and its position sensor (12) will be called servomotor (13).

The temperature of each zone (6) is monitored with a temperature sensor (14) identified in the method as $STz_i$ with the sub-index identifying the number of zone (6). The control signals (15) from the motor (11), the position reading signals (16) from the position sensor (12) and the temperature reading signals (17) from the temperature sensor (14), are connected with a central processing unit (19) by connection means (18).

A pressure sensor (20) attached to the distributor (9) monitors the pressure inside said distributor (9) and sends the pressure reading signal (22) to the central processing unit (19).

The distributor (9) also has a temperature sensor (21) monitoring the air temperature inside the distributor (9) and sending the temperature signal (23) for the temperature of the distributor (9) to the central processing unit (19).

A communication interface (24) translates the two-way electronic signals (25, 26) between the central processing unit (19) and the control board (27) of the air conditioning machine.

FIG. 8 shows the outer appearance of one embodiment of the distributor (9). The distributor (9) is formed by a prismatic enclosure which is coupled on one of its faces to the outlet of the thermal cycle machine (1), a plurality of gate valves (10) and the set of elements driven by the servomotor (13) are shown on the opposite face. The box containing the central processing unit (19) and the communication interface (24) is shown at one of the ends of the distributor (9).

What is claimed is:

1. A regulation method for regulating an air conditioning system where said air conditioning system comprises:
    a) a thermal cycle machine for generating an airflow at a specific temperature, and a pressure greater than atmospheric pressure, where said machine has a signal input interface suitable for specifying at least the machine fan speed $V_m$, or the machine set point temperature $T_m$, or both; allowing the regulation of thermal power and the adjustment of supplied air discharge,
    b) a distributor comprising:
        an inlet coupled to an outlet of the machine,
        a plurality n of outlets for conditioning a plurality of zones where each of the outlets i=1 . . . n in turn comprises a valve with an adjustable actuator that is adjusted according to a degree of aperture $A_i$,
    c) a set of n temperature sensors $STz_i$, i=1 . . . n each of them intended for being located in each of the zones to be conditioned, for providing a temperature signal $Tz_i$ for the temperature measured in the i-th zone,
    d) a central processing unit at least comprising:
        n signal inputs for the reading of the temperature $Tz_i$ in any of the sensors $STz_i$, i=1 . . . n,
        n value inputs for the reading of the set point temperature in each of the zones to be conditioned $Tc_i$, i=1 . . . n,
        n outputs for providing actuation signals, for the independent management of each of the n adjustable actuators of the valves, located at each of the outlets of the distributor,
        an output for providing an actuation signal for acting on the input interface of the thermal cycle machine for modifying its operating parameters;
    where said central processing unit is suitable for iteratively carrying out the regulation method according to the following steps:
    processing the temperature signals comprising the following steps:
        establishing the value of a coefficient $C_t$ associated with the degree of aperture of the plurality of valves, initially taking the value 0, where the value equal to 0 represents that all the valves are closed and the value 1 represents that all the valves are open, for each zone i=1 . . . n, verifying the value of the error between the set point temperature and the measured temperature $|Tc_i-Tz_i|$, so that if said error is greater than a predetermined threshold value $H_T$, then the degree of aperture of the i-th valve is modified by a signal acting in the adjustable actuator according to the formula $A_i = f_t(Tc_i - Tz_i)$, $f_t$ being an increasing function limited between 0 and 1; and the accumulated value of the coefficient $C_t$ increases with the value $A_i/n$,
    providing a $C_t$-dependent signal in the interface of the thermal cycle machine for specifying the machine air fan speed $V_m$, the machine set point temperature $T_m$; or both.

2. The method according to claim 1, wherein the air conditioning system further comprises:
    in the distributor, a pressure sensor $SP_d$ suitable for providing a signal with the value of the pressure $P_d$ inside said distributor;
    in the central processing unit, an input of the pressure signal for the pressure $P_d$ inside the distributor,
    wherein the central processing unit is additionally suitable for processing the pressure signal for the pressure inside the distributor which comprises verifying the value of the error between the pressure measured inside the distributor $P_d$ and a set point pressure $P_c$, i.e., $|P_d - P_c|$, so that if the error is greater than a predetermined threshold value $H_p$, then the value of a coefficient is established by pressure $$C_p = f_p(P_d, P_c) = |P_d - P_c|,$$

and wherein the central processing unit is suitable for processing the temperature signal and the pressure signal in parallel, for providing a $C_t$- and $C_p$-dependent signal in the interface of the thermal cycle machine for specifying the machine air fan speed $V_m$, the machine set point temperature $T_m$; or both.

3. The method according to claim 1, wherein the air conditioning system comprises a storage unit for saving temperature reading records in the n signal inputs of the temperature reading, coming from the sensors $STz_j$, j=1 . . . n, that is represented by $R_{jm}$, where the index j denotes the sensor $STz_j$ and m denotes the reading record number, where the readings are carried out according to a specific frequency $D_f$, and where the central processing unit is suitable for processing the stored values $R_{jm}$ and correcting thermal inertia of the zones to be conditioned by means of the following steps:

establishing the value of a coefficient $C_I$ associated with the degree of thermal inertia in all the sensors $STz_j$, $j=1 \ldots n$ initially taking the value 0, for each $j=1 \ldots n$ estimating the value of the exponential factor for correction due to thermal inertia $I_j = f_I(R_{j1}, \ldots, R_{jm})$, $f_I$ being a function on the set of m values $R_{j1}, \ldots, R_{jm}$ or a subset thereof, verifying the value of the error between the set point temperature and the measured temperature $|Tc_j - Tz_j|$ so that if said error is greater than a predetermined threshold value $H_I$, then the value of the temperature evolution over time $C_j = f_{IT}(M, I_j, Tc_j, Tz_j)$ is calculated, where the values $I_j$, $Tz_j$ and $Tc_j$ so that of the m records $R_{j1}, \ldots, R_{jm}$, counting the number k of sensors to which an error greater than said threshold $H_I$ corresponds, the coefficient $C_I$ is calculated as $$C_I = \frac{1}{k}\Sigma_{j=1}^n C_j,$$

and wherein the signal provided to the interface of the thermal cycle machine for specifying the machine air fan speed $V_m$, the machine set point temperature $T_m$; or both, also depends on the value $C_I$ for providing a correction taking the thermal inertia into account.

4. The method according to claim 1, wherein there is a measurement sensor for providing the temperature of the return airflow $T_r$ returning from the zones to the thermal cycle machine.

5. The method according to claim 1, wherein the fan speed of the thermal cycle machine $V_m$ is specified in the interface of said machine with the value $V_m = f_{vm}(C_t, C_p, C_I, T_r, T_d)$ where the function $f_{vm}$ can be generically expressed as $$f_{vm}(C_t, C_p, C_I, T_r, T_d) = d_1 C_t^{d_2} + d_3 C_p^{d_4} + d_5 C_I^{d_6} + d_7 |T_r - T_d|^{d_8}$$

where $C_t$ is the coefficient associated with the degree of aperture of the plurality of valves by temperature, $C_p$ is the coefficient associated with the degree of aperture of the plurality of valves by pressure if it is evaluated, $C_I$ is the coefficient associated with thermal inertia if it is evaluated; and $T_r$ and $T_d$ are the temperatures of the return air and of the air inside the distributor, respectively, if they are both evaluated, where the coefficients $d_i$, $i=1 \ldots 8$ are positive and take any of the following particular values:

either $d_3 = 0$, $d_5 = 0$, $d_7 = 0$, and $d_2 = 1$, so that the control is directly proportional to the coefficient associated with the degree of aperture of the plurality of valves by temperature, resulting in $f_{vm}(C_t) = d_1 C_t$, or $d_5 = 0$, $d_7 = 0$, $d_2 = 1$ and $d_4 = 1$, so that the control is directly proportional to the variables $C_t$ and $C_p$, resulting in $f_{vm}(C_t, C_p) = d_1 C_t + d_3 C_p$, or $d_5 = 0$, so that the control does not take thermal inertia into account, resulting in $f_{vm}(C_t, C_p, T_r, T_d) = d_1 C_t^{d_2} + d_3 C_p^{d_4} + d_7 |T_r - T_d|^{d_8}$ or $d_3 = 0$, so that the control does not take the change in pressure into account, resulting in $f_{Tm}(C_t, C_I, T_r, T_d) = d_1 C_t^{d_2} + d_5 C_I^{d_6} + d_7 |T_r - T_d|^{d_8}$ or all the coefficients $d_i$, $i=1 \ldots 8$ are not nil.

6. The method according to claim 1, wherein the machine set point temperature $T_m$ is specified in the interface of the thermal cycle machine with the value $T_m = f_{Tm}(C_t, C_p, C_I, T_r, T_d, MF)$, where the function $f_{Tm}$ which is generically expressed as $$f_{Tm}(C_t, C_p, C_I, T_r, T_d, MF) = e_1(T_r + MF \cdot C_I)^{e_2} + MF \cdot (e_3 C_t^{e_4} + e_5 C_p^{e_6} + e_7 (MF \cdot (T_d - T_r))^{e_8})$$

where MF is a variable taking the value −1 distinguishing if the machine generates cold and 1 if it generates heat, the coefficients $e_i$, $i=1 \ldots 8$ are positive and take any of the following particular values:

either $e_3 = 0$, $e_5 = 0$ and $e_7 = 0$, so that the control obtains the machine set point temperature from the return temperature corrected by the inertia of the zones, resulting in $$f_{Tm}(C_I, T_r) = e_1(T_r + MF \cdot C_I)^{e_2}$$

or $e_5 = 0$, so that the control does not take the effect of the change in pressure inside the distributor into account, resulting in $f_{Tm}(C_t, C_I, T_r, T_d) = e_1(T_r + MF \cdot C_I)^{e_2} + MF \cdot (e_3 C_t^{e_4} + e_7 (MF \cdot (T_d - T_r))^{e_8})$ or $e_7 = 0$, so that the control does not take the change in temperature between the inlet and outlet of the machine into account, resulting in $$f_{Tm}(C_t, C_p, C_I, T_r) = e_1(T_r + MF \cdot C_I)^{e_2} + MF \cdot (e_3 C_t^{e_4} + e_5 C_p^{e_6})$$

or all the coefficients $e_i$, $i=1 \ldots 8$ are not nil.

7. The method according to claim 1, wherein the value of the exponential factor for correction due to thermal inertia $I_j = f_I(R_{j1}, \ldots, R_{jm})$ for a specific value j, used in calculating the value of correction due to thermal inertia can be expressed as $I = f_I(R_1, \ldots, R_m) = f_I(Tz_1, \ldots, Tz_m)$ where $$f_I(Tz_1, \ldots, Tz_m) = \frac{b_0}{m-1} \left| \sum_{s=2}^{m} b_{s-1} \cdot (Tz_{s-1} - Tz_s) \right|^{b_m}$$

and where the coefficients $b_i$, $i=1 \ldots 8$ are positive and take any of the following particular values:

either $b_1 = b_2 = \ldots = b_{m-1} = m-1$ and $b_m = 1$, so that the control is proportional to the difference between the first and last temperature record of the zone, resulting in $$f_I(Tz_1, \ldots, Tz_m) = f_I(Tz_1, Tz_m) = b_0 |Tz_1 - Tz_m|$$

or $b_1 = b_2 = \ldots = b_{m-1} = m-1$ and $b_m = 0.5$, so that the control is proportional to the square root of the difference between the first and last temperature record of the zone, resulting in $$f_I(Tz_1, \ldots, Tz_m) = f_I(Tz_1, Tz_m) = b_0 |Tz_1 - Tz_m|^{0.5}$$

or all the coefficients $b_i$, $i=1 \ldots m$ are not nil.

8. The method according to claim 1, wherein the value of temperature evolution over time $f_{IT}(M, I_j, Tc_j, Tz_j)$ for a specific value j is expressed as $$f_{IT}(M, I_j, Tc_j, Tz_j) = M^{I_j} |Tc_j - Tz_j|^{c_1}$$

where M is the multiplicative factor for correcting thermal inertia, $I_j$ is the exponential factor for correction due to thermal inertia, $Tc_j$ and $Tz_j$ are the set point temperature and zone temperature, respectively, and the coefficient $c_1$ is positive and takes any of the following particular values:

either $c_1 = 1$, so that the control is proportional to the difference between the set point temperature and the zone temperature, resulting in $$f_{IT}(M, I_j, Tc_j, Tz_j) = M^{I_j} |Tc_j - Tz_j|$$

or $c_1=2$, so that the control is proportional to the square of the difference between the set point temperature and the zone temperature, resulting in $$f_{IT}(M, I_j, Tc_j, Tz_j) = M_j^{c_j} |Tc_j - Tz_j|^2$$

or $c_1=0.5$, so that the control is proportional to the square root of the difference between the set point temperature and the zone temperature, resulting in $$f_{IT}(M, I_j, Tc_j, Tz_j) = M_j^{c_j} |Tc_j - Tz_j|^{0.5}$$

or $c_1$ is a positive value other than 0.5, 1, or 2.

9. The method according to claim 1, wherein the degree of aperture of the i-th zone is expressed as $A_i = f_t(Tc_i, Tz_i, MF)$ and particularly $f_t$ being dependent on the difference in temperatures $Tc_i$, $Tz_i$, i.e., $$A_i = f_t(Tc_i - Tz_i, MF)$$

where MF is a variable taking the value −1 distinguishing if the machine generates cold and 1 if it generates heat, $Tc_i$ and $Tz_i$ are the set point temperature and the room temperature of the i-th zone, respectively; the function $f_t$ can be expressed as $$f_t(Tc_i, Tz_i, MF) = \begin{cases} a_1(Tc_i - Tz_i)^{a_2} & Si\ Tc_i \geq Tz_i\ y\ MF = 1 \\ -a_1(Tc_i - Tz_i)^{a_2} & Si\ Tc_i < Tz_i\ y\ MF = -1 \end{cases}$$

where the coefficients $a_1$ and $a_2$ are positive and take any of the following particular values:
either $a_2=1$, so that the control is proportional to the difference between the set point temperature and the zone temperature, resulting in $$f_t(Tc_i, Tz_i, MF) = \begin{cases} a_1(Tc_i - Tz_i) & Si\ Tc_i \geq Tz_i\ y\ MF = 1 \\ -a_1(Tc_i - Tz_i) & Si\ Tc_i < Tz_i\ y\ MF = -1 \end{cases}$$

or $a_2=2$, so that the control is proportional to the square of the difference between the set point temperature and the zone temperature, resulting in $$f_t(Tc_i, Tz_i, MF) = \begin{cases} a_1(Tc_i - Tz_i)^2 & Si\ Tc_i \geq Tz_i\ y\ MF = 1 \\ -a_1(Tc_i - Tz_i)^2 & Si\ Tc_i < Tz_i\ y\ MF = -1 \end{cases}$$

or $a_2=0.5$ so that the control is proportional to the square root of the difference between the set point temperature and the zone temperature, resulting in $$f_t(Tc_i, Tz_i, MF) = \begin{cases} a_1(Tc_i - Tz_i)^{0.5} & Si\ Tc_i \geq Tz_i\ y\ MF = 1 \\ -a_1(Tc_i - Tz_i)^{0.5} & Si\ Tc_i < Tz_i\ y\ MF = -1 \end{cases}$$

or all the coefficients $a_i$, i=1, 2 are not nil.

10. The method according to claim 1, wherein in addition to the error $|Tc_i - Tz_i|$ the sign of $Tc_i - Tz_i$ is taken into account so that if is positive, it indicates to the thermal cycle machine that it must provide cold, which is expressed as MF=−1; and if it is negative, it indicates to the thermal cycle machine that it must provide heat, which is expressed as MF=1.

11. The method according claim 1, wherein the maximum aperture value of one or more valves, the minimum aperture value of one or more valves; or both is pre-established either by the central processing unit, mechanically, or by both.

12. The method according to claim 1, wherein the iterative cycle for controlling the aperture of valves carries out a stabilization pause before performing the following iteration.

13. The method according to claim 1, wherein the iterative cycle for controlling the aperture of valves verifies if there is a stop condition before performing the following iteration so that the machine is stopped if said condition exists.

* * * * *